June 23, 1970 R. W. HUGHES 3,516,443
PILOT OPERATED VALVE
Filed Nov. 13, 1967

INVENTOR.
ROBERT W. HUGHES
BY
Frank H Thomson
ATTORNEY

United States Patent Office 3,516,443
Patented June 23, 1970

3,516,443
PILOT OPERATED VALVE
Robert W. Hughes, Easton, Pa., assignor to Ingersoll-Rand Company, New York, N.Y., a corporation of New Jersey
Filed Nov. 13, 1967, Ser. No. 682,141
Int. Cl. F16k 11/02, 11/10
U.S. Cl. 137—625.66   5 Claims

ABSTRACT OF THE DISCLOSURE

A valve which includes a casing defining a cylindrical chamber in which there is an elastomeric ball having a diameter larger than the diameter of the chamber. A pair of passages communicate with the chamber and there is a seat positioned between the two passages. The elastomeric ball fits against this seat to prevent communication between these two passages. In one embodiment a pilot passage communicates with the chamber and permits pilot fluid to force the ball against the seat. In a second embodiment there is a passage which permits communication between a third passage and the first passage when the ball is seated. The valve of the second embodiment may be used with a consumer such as an air motor to prevent back pressure build up at the consumer exhaust.

BACKGROUND OF THE INVENTION

This invention relates to pilot operated valves and in particular to pilot operated valves which are capable of providing remote control for equipment with a high level of operational vibration and where back pressure build-up is undesirable.

The principle of the pilot operated valve is generally known. It usually includes a pilot line for conducting fluid under pressure to the valve which controls the seating and unseating of a valve element which, in turn, controls the flow of fluid through the valve and between two points. Most pilot operated valves are quite complex and expensive to manufacture and maintain. They have the disadvantage that an increase in vibration of the equipment being operated will destroy the sealing capabilities of the valve element. Prior pilot valves require both a sealing device to prevent flow between two points and some piston means for controlling the sealing device. It is also known to use elastomeric balls as a valve element but, in general, their use has been limited to check valves and their advantages have not been fully utilized.

In most present fluid flow control systems for use with fluid pressure operated consuming devices such as air motors in which a reversing feature is desirable, if the consumer is remotely located, the supply and exhaust lines must necessarily be long. The length of the exhaust line causes a build-up of back pressure at the exhaust which seriously affects the operation of the consumers. If the exhaust is provided adjacent the consumer, the reversibility of the system is lost when operating at a remote location.

SUMMARY

It is therefore the principal object of this invention to provide a novel valve which is adapted for use in apparatus which may subject the valve to large amounts of vibration.

It is a further object of this invention to provide a valve which is of simple construction and eliminates parts previously required in pilot operated valves.

It is still a further object of this invention to provide a novel valve which can be used in a fluid flow control system and improves the reversing capabilities of the system.

The foregoing and other objects are carried out by providing a casing defining a cylindrical chamber and having first and second passage means communicating with the cylindrical chamber. A seat is positioned in said cylindrical chamber between the first and second passage means. There is an elastomeric ball positioned in the cylindrical chamber and having a diameter at least as large as the diameter of the cylindrical chamber. The casing is further provided with a third passage means for conducting fluid under pressure to the cylindrical chamber for moving the ball against the seat and preventing communication between the first and second passage means.

BRIEF DESCRIPTION OF THE DRAWING

The invention is described in connection with the acpanying drawing wherein.

DESCRIPTION OF THE PREFERRED EMBODIMENTS

Figure 1:
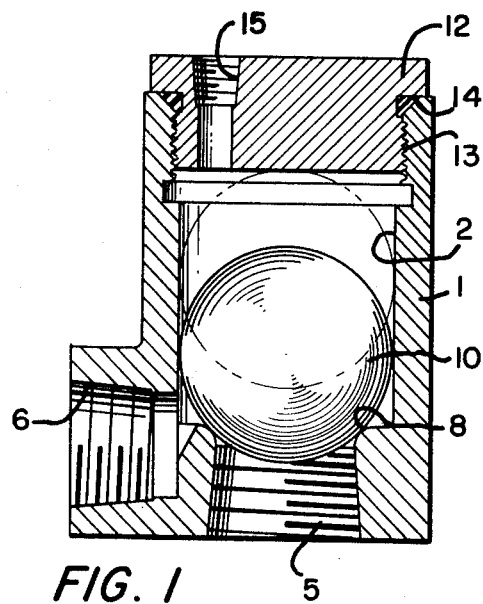
FIG. 1 is a sectional view of one embodiment of this invention.

Referring to the drawing and in particular to FIG. 1, there is shown a valve which is of the pilot operated type. The valve includes a casing 1 which defines a cylindrical chamber 2 having a uniform diameter throughout its entire length. The casing 1 is provided with a first passage means 5 communicating with the cylindrical chamber 2 and a second passage means 6 also communicating with the cylindrical chamber 2. Each of these passages may be suitably threaded for receiving a conduit (not shown) for conducting fluid under pressure between two points. A valve seat 8 is positioned at the point where the first passage 5 communicates with the cylindrical chamber 2 and is located between the first passage 5 and second passage 6.

The upper end of the casing 1 is closed by a cap 12 threadedly engaged with the casing 1 as at 13. Seal means 14 is provided betwen the cap 12 and casing 1. A pilot or third passage means 15 communicates with the chamber 2 through the cap 12. This passage is also threaded to receive a conduit (not shown) for conducting fluid under pressure.

An elastomeric ball 10 having a diameter at least as large and preferably larger than the diameter of the cylindrical chamber 2 is positioned in the chamber 2 so that the ball can deform and form a seal at the point where the ball 10 meets the inside of chamber 2. This seal prevents communication between pilot passage 15 and the first or second passage, 5 or 6. The seat 8 has a diameter smaller than the diameter of the chamber 2 and ball 10 so that the ball can deform and form a seal at the seat to prevent communication between passages 5 and 6. The vibration of the system to which the valve is connected or the mere movement of the ball 10 up and down in the chamber 2 tends to rotate the ball 10 so that a new seal is continuously formed between the ball 10 and chamber 2 as well as between the ball 10 and the seat 8. Because a continuously new seal is formed, the valve of this invention will outlast prior pilot operated valves. Most present pilot operated valves employ a piston which is moved by fluid under pressure and which, in turn, moves a seal forming means. The piston and/or the surface of chamber 2 will wear and a seal will no longer be formed, leakage will result and the valve will not function. With the present valve, the ball acts as both piston and sealing device. A new seal is continuously formed so that even though wear will occur, the valve will last longer. If the internal surface of the chamber 2 wears, the ball will expand and continue to form a seal.

In operation, fluid under pressure will normally flow from the first passage 5 to the second passage 6. This will occur when the ball 10 is in the position shown by the broken line in FIG. 1. When it is desired to prevent communication between the first passage 5 and the second passage 6, pilot fluid is supplied through the passage 15 to the chamber 2. This fluid under pressure will move the ball downwardly causing it to form a seal at the seat 8 and communication between the first passage 5 and the second passage 6 will be prevented. When it is desired to permit fluid flow between passages 5 and 6, the pilot passage 15 or the conduit conducting fluid under pressure to passage 15 is exhausted to atmosphere or other low pressure area and the pressure at the first passage 5 moves the ball 10 to the position shown in broken lines of FIG. 1.

The valve of this embodiment is particularly useful as an element of a system employing many such valves. The valves may be combined in series, parallel or series-parallel relationship to satisfy many operating conditions.

Figure 2:
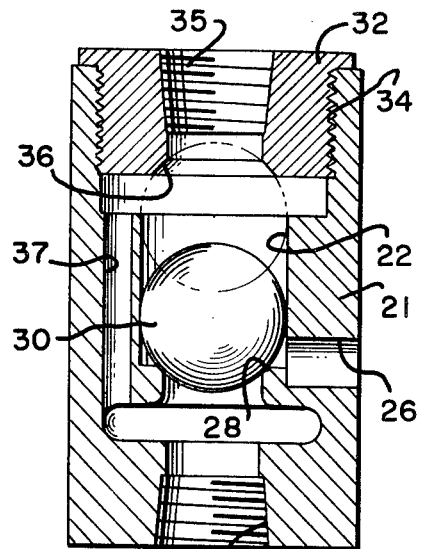
FIG. 2 is a sectional view of a second embodiment of this invention.

FIG. 2 shows a second embodiment of this invention. In this embodiment, the casing is generally indicated at 21 and defines a cylindrical chamber 22 having a uniform diameter throughout its entire length. A first passage means 25 is in communication with the chamber 22 and threaded to receive a conduit for carrying fluid under pressure. A second passage 26 communicates with atmosphere. A cap 32 is threaded into the casing as at 34 and is provided with third passage means 35. A seat 28 is positioned at the point where the first passage 25 communicates with the chamber 22. A second seat 36 is provided at the point where the third passage 35 communicates with the chamber 22. A bypass 37 is provided in the casing 21 and permits selective communication between the third passage 35 and the first passage 25. An elastomeric ball 30 is positioned in the chamber 22 and has a diameter at least as large and preferably larger than the diameter of the chamber 22 for a purpose similar to that of the embodiment of FIG. 1. The seats 28 and 36 have a diameter smaller than the diameter of the chamber 22 so that the ball 30 can form a seal with these seats in the same manner as the ball 10 formed a seal at the seat 8 in the embodiment of FIG. 1. The ball 30 being elastomeric and larger in diameter than the diameter of the chamber 22 provides the same advantages as the ball 10 of the embodiment of FIG. 1.

Figure 3:
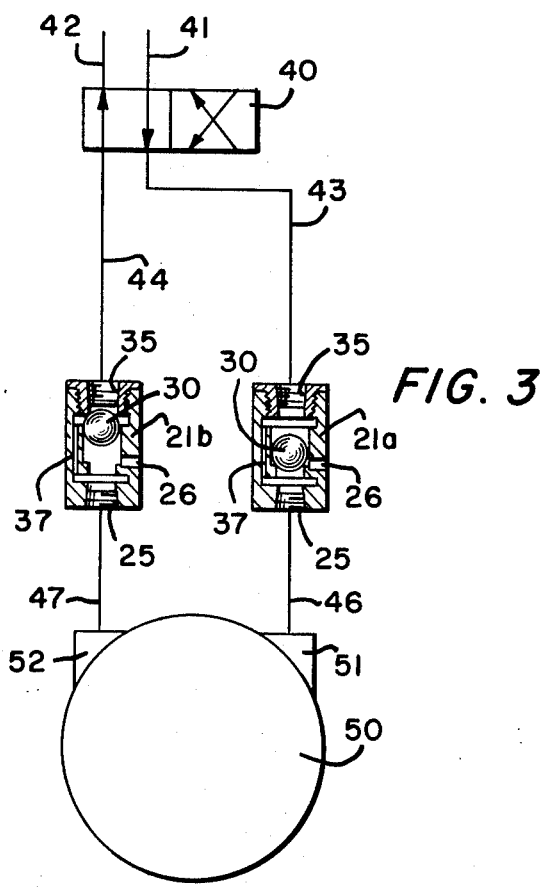
FIG. 3 is a generally schematic view of a fluid flow control system employing the second embodiment of this invention.

The operation of the valve of FIG. 2 can best be illustrated by referring to the flow control system of FIG. 3 wherein a pair of valves of the type shown in the embodiment of FIG. 2 are illustrated. A suitable four-way valve is provided and is in communication with a pair of conduits 41 and 42. The conduit 41 communicates with a suitable source of fluid under pressure while the conduit 42 communicates with a low pressure area such as atmosphere. Leading from the four-way valve are a pair of conduits 43 and 44 which lead to valves 21a and 21b, respectively, each of which is of the type shown in FIG. 2. The conduits 43 and 44 are connected to the third passage 35 of the valve. Additional conduits 46 and 47 communicate with the valve of FIG. 2 through the first passage means 25. The conduits 46 and 47 lead to a consumer of fluid under pressure such as an air motor designated at 50.

When it is desired to operate the consumer in one direction, fluid under pressure is supplied through the conduit 41, through the reversing valve 40, conduit 43 to valve 21a, via passage 35. The fluid under pressure will force the ball 30 downward to form a seal at the seat 28 and will go through the bypass 37 around the ball 30 to the first passage 25 and the conduit 46 to the inlet 51 of the consumer 50. The ball 30 acts as a piston preventing communication passages 35 and 26 and as a valve to form a seal at seat 28 preventing communication between passages 25 and 26. Low pressure fluid from the consumer 50 will leave exhaust passage 52, pass through conduit 47 to the first passage 25 of valve 21b. Since third passage 35 communicates with atmosphere or another low pressure area through conduits 44 and 42, the low pressure fluid at the first passage 25 will force the ball 30 upward to form a seal at the seat 36 permitting communication between passage 25 and passage 26 to atmosphere and preventing communication between passage 25 and passage 35. Initially, there may be a tendency for the exhaust fluid to flow through bypass 37 to the third passage 35 and the conduit 44, but the ball 30 will move upwardly because any fluid under pressure moving through bypass 37 will be throttled so that the pressure on the lower side of the ball is greater than the upper side.

The valve of this embodiment is particularly advantageous in this application because it permits exhaust of the consumer adjacent the consumer and prevents a build-up of back pressure in the consumer which will severely hamper its efficiency. If the consumer were remote from the source of fluid under pressure, the exhaust conduit would necessarily be long if the reversing valve 40 is to be employed. The greater the distance to the exhaust point, the larger the pressure build-up.

To reverse the consumer 50, the four-way valve 40 is positioned so that the conduit 41 communicates with the conduit 44. Fluid under pressure now moves through the passage 44 to the third passage 35 of the valve 21b forcing the ball 30 downwardly permitting communication through the passage 47 with the consumer 50 and what is now inlet 52. Exhaust is in the same manner as above except this time it is through the valve 21a. It can readily be seen therefore that the reversibility of the consumer 50 has been maintained, but the operation of the consumer in remote locations is improved due to the ability to exhaust adjacent the consumer and prevent pressure build-up.

I claim:

1. A valve comprising:
    a casing defining a cylindrical chamber and having first and second passage means communicating with said cylindrical chamber;
    said first passage means being adapted to conduct fluid under pressure into and exhaust fluid under pressure from said cylindrical chamber;
    said second passage means being adapted to conduct fluid under pressure from said cylindrical chamber;
    seat means in said cylindrical chamber positioned between said first and second passage means;
    an elastomeric ball positioned in said cylindrical chamber and having a diameter larger than the diameter of said cylindrical chamber;
    said casing being provided with third passage means for conducting fluid under pressure to said cylindrical chamber for moving said ball against said seat and preventing communication between said first and second passage means; and
    means providing communication between said third and first passage means when said ball is against said seat;
    the fluid under pressure supplied into said cylindrical chamber through said first passage means being adapted to move said ball to permit communication between said first and second passage means and prevent communication between said first and third passage means.

2. The valve of claim 1 wherein said seat is located at the point said first passage communicates with said cylindrical chamber.

3. The valve of claim 2 wherein said cylindrical chamber is uniform in diameter throughout its entire length and has a diameter larger than the diameter of said seat.

4. The valve of claim 1 wherein said seat is positioned at the point said first passage means communicates with said cylindrical chamber and said cylindrical chamber is uniform in diameter throughout its entire length and has a diameter larger than the diameter of said seat.

5. The valve of claim 4 further comprising a second seat positioned at the point said third passage means communicates with said cylindrical chamber.

References Cited
UNITED STATES PATENTS

| | | | |
|---|---|---|---|
| 2,816,420 | 12/1957 | Walsh | 137—625.66 XR |
| 2,918,906 | 12/1959 | Becker | 137—596 |
| 2,707,002 | 4/1955 | Harris | 92—172 XR |
| 3,151,623 | 10/1964 | Riordan | 137—112 |
| 3,273,468 | 9/1966 | Allen | 137—596.2 XR |
| 3,274,902 | 9/1966 | Kleckner | 137—596.2 XR |
| 3,360,234 | 12/1967 | Thorburn | 251—44 |

HENRY T. KLINKSIEK, Primary Examiner

U.S. Cl. X.R.

137—596; 92—172; 91—469